L. E. CORNU.
INTAKE MANIFOLD GASKET.
APPLICATION FILED APR. 15, 1918.
1,293,718.
Patented Feb. 11, 1919.
2 SHEETS—SHEET 2.
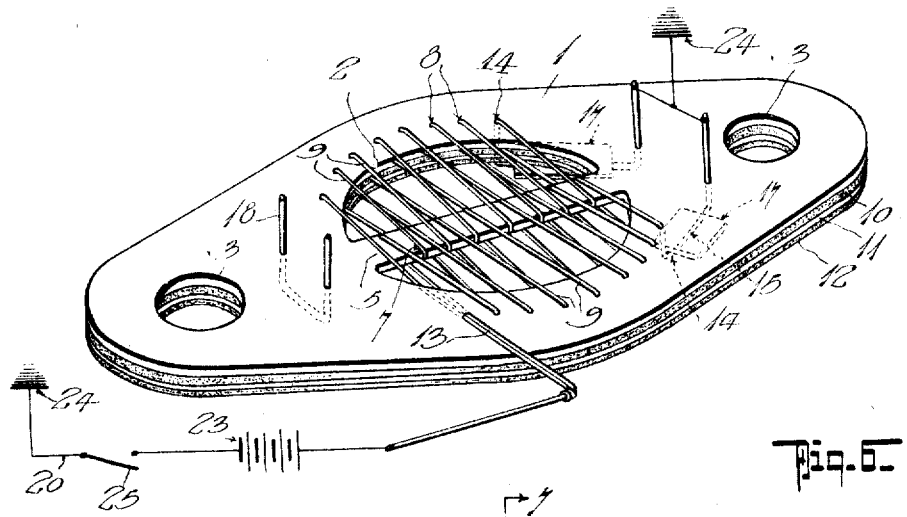
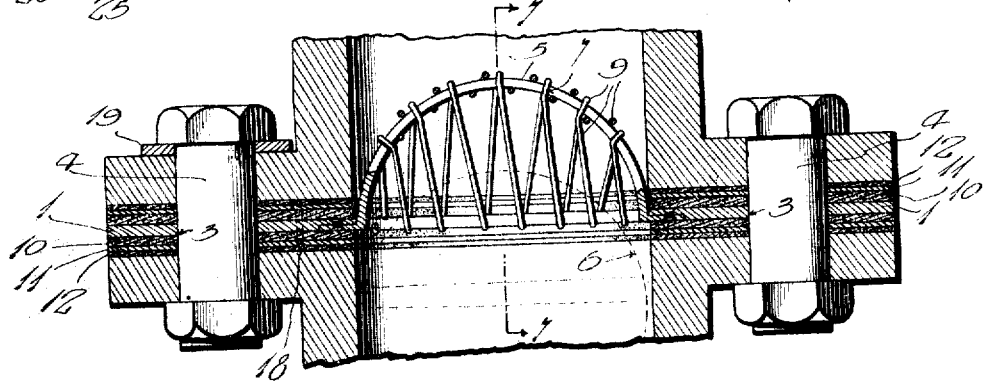
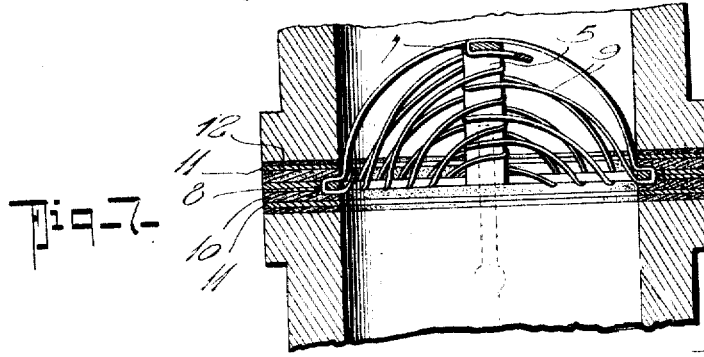
Witness
H. Woodard
Inventor
L. E. Cornu
By H. B. Willson &co
Attorneys

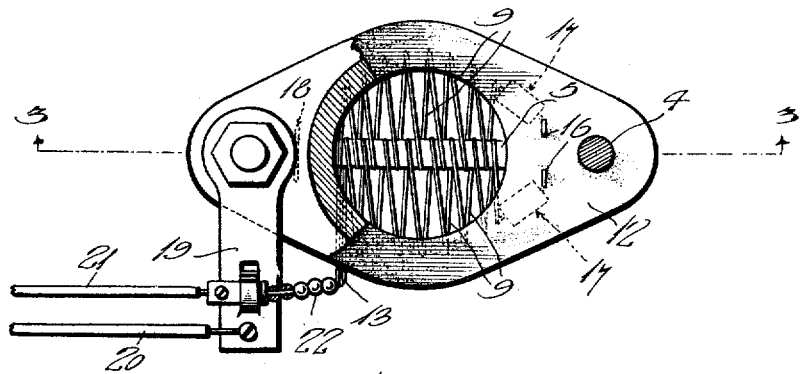
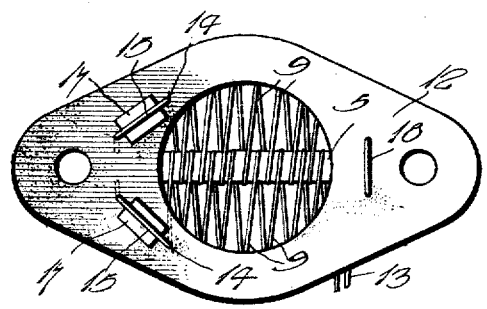
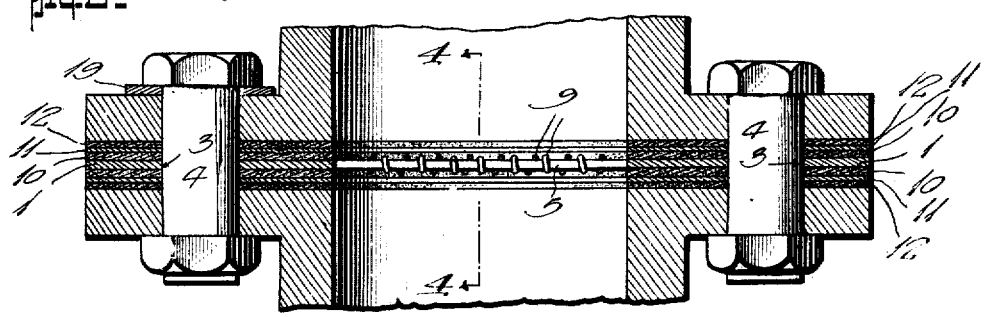
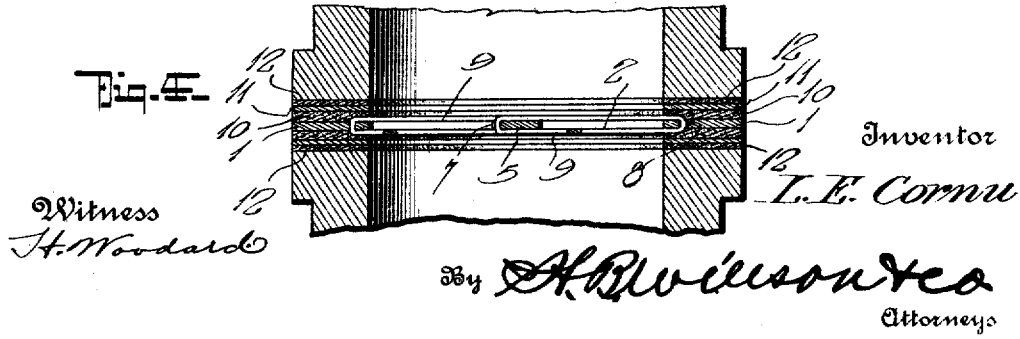

UNITED STATES PATENT OFFICE.

LOUIS E. CORNU, OF ENID, OKLAHOMA, ASSIGNOR OF FIVE-SIXTEENTHS TO CLEMENT L. SAYLES, FIVE-SIXTEENTHS TO HARRY STURNS, AND TWO-SIXTEENTHS TO GEORGE D. WILSON, ALL OF ENID, OKLAHOMA.

INTAKE-MANIFOLD GASKET.

1,293,718.     Specification of Letters Patent.     Patented Feb. 11, 1919.

Application filed April 15, 1918. Serial No. 228,657.

*To all whom it may concern:*

Be it known that I, LOUIS E. CORNU, a citizen of the United States, residing at Enid, in the county of Garfield and State of Oklahoma, have invented certain new and useful Improvements in Intake-Manifold Gaskets; and I do declare the following to be a full, clear, and exact description of the invention, such as will enable others skilled in the art to which it appertains to make and use the same.

My invention has for its object to provide a novel form of gasket to be used between the intake manifolds of internal combustion engines and the carbureters thereof, said gasket embodying electric resistance wires for heating the fuel as it passes through the usual opening of the gasket.

A further object is to provide a device of the class which may be easily and inexpensively manufactured and marketed, easily and quickly applied, and one which will be highly efficient and durable.

With the foregoing in view, the invention resides in the novel features of construction and arrangements of parts as hereinafter fully described and claimed, the descriptive matter being supplemented by the accompanying drawings which form a part of this specification and in which:

Figure 1 is a top plan view of one of the gaskets applied to use and showing a portion of the intake manifold in horizontal section;

Fig. 2 is a top plan view of the gasket seen in Fig. 1;

Fig. 3 is a longitudinal section on the plane of the line 3—3 of Fig. 1 showing the gasket applied;

Fig. 4 is a transverse section on the plane indicated by the line 4—4 of Fig. 3;

Fig. 5 is a perspective view of the central lamination which carries the resistance wires;

Fig. 6 is a view similar to Fig. 3 showing a different form of construction; and Fig. 7 is a transverse section of Fig. 6 on the plane of the line 7—7 thereof.

In the drawings above briefly described, the numeral 1 designates the main central lamination of the gasket, said lamination being preferably formed of mica although any other other preferred material could be employed. Lamination 1 is formed with a central opening 2 for registration with the intake manifold and the carbureter outlet, and with smaller openings 3 in its ends through which the coupling bolts 4 of the carbureter and manifold pass. A bridge 5 extends diametrically across the opening 2 and will preferably be of the straight formation depicted in Figs. 3, 4 and 5. When the device is to be used in connection with carbureters in which the upper edge of the throttle valve 6 projects into the intake manifold, it is necessary to arch the bridge 5 as shown in Figs. 6 and 7. When this is done the bridge in question is necessarily made either totally or partially separate from the gasket 1 and suitably secured to the latter, whereas when the bridge is of rectilinear formation, it may be formed integrally with the lamination 1 as shown for instance in Fig. 5.

Regardless of its exact shape, the bridge 5 is provided in its opposite edges with notches 7, and the lamination 1 is formed with perforations 8 adjacent the edge of the opening 2, a pair of thread-like resistance wires 9 being trained to and fro across the opening 2 and laced into the aforesaid notches and perforations. The ends of these wires are utilized for supplying current thereto in a manner to be hereinafter described.

Laminations 10 preferably of asbestos are applied to the upper and lower sides of the lamination 1, other mica laminations 11 engage the outer faces of said laminations 10, and still other asbestos laminations 12 are provided on the outer faces of the laminations 11, this particular arrangement being preferable although more or less laminations could well be employed. One end 13 of the wires 9 extend beyond the edge of the gasket between the lamination 1 and one of the laminations 10 as will be clear from Fig. 5, while the other ends of said wires pass through the laminations at 14 to one side of the gasket, extend along this side a suitable distance as shown at 15, then return through the several laminations to the opposite side of the gasket and are clenched upon the latter as shown at 16, the exposed portions 15 of the wires being soldered, brazed or otherwise secured to ground plates 17 of infinitesimal thickness. Passage of the wires through the laminations of the gasket holds one end of said laminations together securely and a wire staple 18 is employed for holding the laminations at the other end of the gasket in proper relation.

A suitable binding post 19 is adapted to be clamped by one of the bolts 4, said bolt being provided with a ground wire 20 and with another wire 21 insulated therefrom, the free ends 13 of the wires 9 being electrically connected with the wire 21 and insulated by any suitable means such as the beads 22 shown in Fig. 1. In Fig. 5, wire 20 is shown leading from a battery 23 and grounded at 24 on the frame of the machine, on the motor, or any other preferred part, while wire 21 leads from said battery to the ends 13 of the resistance wires 9. It thus follows that when the gasket is clamped in place as shown in Figs. 3, 4, 6 and 7, the current will flow from the battery through wire 21 to the resistance wires 9, from the latter the current will ground by means of the plates 15 which contact with the carbureter or intake manifold, and from this ground the current will return to the battery through the wire 20, a suitable switch 25 being provided for breaking the circuit whenever required.

By the use of the device, extremely advantageous results can be obtained since closing of the switch 25 will raise the temperature of the resistance wires 9 sufficiently to properly heat the mixture passing from the carbureter through the intake manifold to the engine cylinders, thus rendering this mixture sufficiently volatile to fire quickly and easily in the engine.

Since probably the best results are obtained from the details shown and described, these details are preferably employed, but within the scope of the invention as claimed, numerous minor changes may well be made.

I claim:

1. An intake manifold gasket comprising a lamination of insulating material having an opening through which the fuel passes, a bridge of insulation spanning said opening, the edges of said bridge having notches and said lamination having perforations adjacent the edge of the opening, resistance wiring trained to and fro across said opening and laced into said perforations and notches, the wires from each side of said opening extending around the opposite edge of said bridge and being held from contact with each other by engagement in said perforations and notches, the terminals of said wiring being located for supplying current thereto, and other laminations applied to the upper and lower sides of said first named lamination.

2. An intake manifold gasket having an opening through which the fuel passes and comprising a plurality of laminations of insulating material, resistance wiring trained across said opening and carried by one of the intermediate laminations, one terminal of said wiring extending to the edge of the gasket between certain of the laminations for connection with a current supply wire, and the other terminal of said wiring passing through said lamination to one side of the gasket, and being clenched to hold one end of said laminations together, and means for securing the other ends of said laminations together.

3. An intake manifold gasket having an opening through which the fuel passes and comprising a plurality of laminations of insulation, one of the intermediate laminations having a bridge of insulation across its opening, said bridge having notches in its edges and said lamination having perforations adjacent the edge of said opening, a pair of resistance wires trained to and fro across said opening and laced through said perforations and notches, one end of said wires extending to the edge of the gasket between the laminations for connection with a current supply wire and the other ends of said wires passing through said laminations to one side of the gasket, then passing back through said laminations to the other side of the gasket and being clenched, to hold one end of said laminations together, ground plates secured to the portions of the wires exposed at said first named side of the gasket, and means for securing the ends of said laminations opposite said ground plates together.

In testimony whereof I have hereunto set my hand in the presence of two subscribing witnesses.

LOUIS E. CORNU.

Witnesses:
Geo. D. Wilson,
G. J. Cannon.